(12) United States Patent
Agrawal et al.

(10) Patent No.: US 9,843,672 B1
(45) Date of Patent: Dec. 12, 2017

(54) MANAGING CALLS

(71) Applicant: Motorola Mobility LLC, Chicago, IL (US)

(72) Inventors: Amit Kumar Agrawal, Bangalore (IN); Himanshu Chug, Bangalore (IN)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

(21) Appl. No.: 15/351,382

(22) Filed: Nov. 14, 2016

(51) Int. Cl.
*H04M 3/42* (2006.01)
*H04M 3/533* (2006.01)
*H04M 1/725* (2006.01)

(52) U.S. Cl.
CPC ... *H04M 3/42221* (2013.01); *H04M 1/72547* (2013.01); *H04M 3/53366* (2013.01); *H04M 1/72583* (2013.01)

(58) Field of Classification Search
CPC .................................................. H04M 3/42221
USPC ............. 379/85; 455/412.1, 413, 414.1, 421, 455/422.1, 423, 466; 381/82; 434/185; 704/226; 715/773
See application file for complete search history.

(56) References Cited

U.S. PATENT DOCUMENTS

| | | | | |
|---|---|---|---|---|
| 5,995,830 A * | 11/1999 | Amin | ..................... | H04M 3/42 379/32.01 |
| 6,366,785 B2 * | 4/2002 | Saarela | ..................... | H04M 3/48 379/212.01 |
| 7,072,641 B2 | 7/2006 | Satapathy | | |
| 7,076,245 B1 * | 7/2006 | Satapathy | ............. | H04W 24/08 370/241 |
| 7,389,107 B1 * | 6/2008 | Satapathy | ............. | H04M 1/656 455/226.2 |
| 7,493,103 B2 * | 2/2009 | Finley, Jr. | ................. | H04L 1/00 455/412.1 |
| 7,711,353 B1 * | 5/2010 | Satapathy | ............. | H04M 1/656 455/226.2 |
| 7,970,385 B1 * | 6/2011 | Satapathy | ............. | H04M 1/656 455/226.2 |
| 8,033,831 B2 * | 10/2011 | Julia | ....................... | G09B 7/02 434/185 |
| 2002/0115429 A1 * | 8/2002 | Deluca | ................. | H04M 1/656 455/413 |

(Continued)

OTHER PUBLICATIONS

"Non-Final Office Action", U.S. Appl. No. 15/351,394, dated Jun. 22, 2017, 10 pages.

(Continued)

*Primary Examiner* — Gerald Gauthier

(57) ABSTRACT

Different call managing techniques are described for both voice calls and video calls. A call management system detects that a user is on an active call. The call management system detects that the user has continued to speak when the call was disconnected, as by another user terminating the call or poor network conditions. When the call management system detects a disconnected call, it records the spoken speech into a buffer and determines which portion of the user's speech was not processed and communicated to the other user. The user whose call was terminated is provided with an option to provide the un-communicated speech to the other user. Options can include sending a text version of the un-communicated speech to the other user or sending a voice file to the other user.

20 Claims, 10 Drawing Sheets

(56) References Cited

U.S. PATENT DOCUMENTS

| | | | |
|---|---|---|---|
| 2004/0058676 A1* | 3/2004 | Kato | H04M 1/2535 |
| | | | 455/422.1 |
| 2004/0203607 A1* | 10/2004 | Satapathy | H04M 1/656 |
| | | | 455/412.1 |
| 2004/0203645 A1* | 10/2004 | Forman | H04M 3/2272 |
| | | | 455/414.1 |
| 2005/0245250 A1* | 11/2005 | Ebenshpanger | H04W 84/08 |
| | | | 455/421 |
| 2006/0019650 A1* | 1/2006 | Kedem | H04W 76/02 |
| | | | 455/422.1 |
| 2007/0129941 A1* | 6/2007 | Tavares | G10L 17/26 |
| | | | 704/226 |
| 2010/0067680 A1 | 3/2010 | Hanson et al. | |
| 2010/0080382 A1 | 4/2010 | Dresher et al. | |
| 2013/0051543 A1 | 2/2013 | McDysan et al. | |
| 2013/0288655 A1 | 10/2013 | Foruntanpour et al. | |
| 2013/0316687 A1 | 11/2013 | Subbaramoo et al. | |
| 2013/0321156 A1 | 12/2013 | Liu | |
| 2014/0006944 A1 | 1/2014 | Selig et al. | |
| 2015/0040055 A1* | 2/2015 | Zhao | G06F 3/04886 |
| | | | 715/773 |
| 2015/0139441 A1* | 5/2015 | Kawalkar | H04M 3/20 |
| | | | 381/82 |
| 2015/0156598 A1 | 6/2015 | Sun et al. | |
| 2015/0195411 A1 | 7/2015 | Krack et al. | |
| 2015/0213296 A1 | 7/2015 | Xue | |
| 2016/0117940 A1 | 4/2016 | Gomory et al. | |
| 2016/0182727 A1 | 6/2016 | Baran et al. | |

OTHER PUBLICATIONS

"Notice of Allowance", U.S. Appl. No. 15/351,394, Aug. 7, 2017, 9 pages.

* cited by examiner

*Dan:* Hey Mitch! What's up?

*Mitch:* Nothing. Say, you remember that you are invited to my house for the Packers game this Sunday?

*Dan:* You bet. What time should I come over?

*Mitch:* Game is at 1, so how about 11 or so?

*Dan:* Sure thing -- I'll be there.

*Call Disconnects*

*Dan:* Hey, can I bring some beverages?

*Dan:* Hey Mitch! What's up?

*Mitch:* Nothing. Say, you remember that you are invited to my house for the Packers game this Sunday?

*Dan:* You bet. What time should I come over?

*Mitch:* Game is at 1, so how about 11 or so?

*Dan:* Sure thing -- I'll be there.

*Call Disconnects*

*Dan:* Hey, can I bring some beverages?

Dan: Hey Mitch! What's up?

Mitch: Nothing. Say, you remember that you are invited to my house for the Packers game this Sunday?

Dan: You bet. What time should I come over?

Mitch: Game is at 1, so how about 11 or so?

Dan: Sure thing -- I'll be there.

*Call Mutes*

Dan: Hey, can I bring some beverages?

*Mitch:* Hey Dan! What's up?

*Dan:* Nothing. Say, you remember that you are invited to my house for the Packers game this Sunday? My friend Brian lives by you. He can pick you up. His number is 555- [network problems]. You can call him.

*Mitch:* You bet. I didn't get his number, can you repeated it?

MANAGING CALLS

BACKGROUND

Managing calls, such as voice and video calls, can be challenging on many different levels. For example, in some scenarios a voice caller may continue to speak while the other caller ends the call thinking that the conversation is over. This might happen in instances when a caller does not end the call with an explicit salutation such as "goodbye" or "talk to you later" and simply hangs up or terminates the call. In this instance, a part of the conversation can be lost. This can also be the case when network issues are encountered, such as dropped packets and the like. This may cause a caller to have to make another call or to simply ignore the fact that part of their conversation has been dropped.

In other scenarios, in a video or voice call, if a caller does not wish for other callers to hear them for a moment, they can mute their audio. This can be done, for example, by turning off a microphone. Often times, when audio is muted during a call, the caller will forget that they have muted the audio and will begin speaking. They may continue speaking for a while until they realize that the audio is muted. After un-muting the audio, the caller will typically have to repeat the information that they conveyed while the audio was muted. If such instances occur multiple times in the same call or during several calls with the same audience, the caller may be embarrassed and can compromise the meeting time.

In yet other scenarios which are very common during a voice call, one caller will give the other caller information such as a phone number, address, bank information and the like. The other caller may fail to completely understand and may thus ask the first caller to repeat the information. This situation can occur for a number of reasons including a bad network connection, low bandwidth, and the like. Having to repeat this information may cause the first caller to become frustrated.

These and other scenarios continue to pose challenges to those who design communication systems.

BRIEF DESCRIPTION OF THE DRAWINGS

Embodiments of managing calls are described with reference to the following Figures. The same numbers may be used throughout to reference like features and components that are shown in the Figures.

DETAILED DESCRIPTION

Overview

The various embodiments described herein provide different ways for managing calls—both voice calls and video calls. In at least some embodiments, a call management system detects that a user is on an active call. The call management system detects that the user has continued to speak when the call was disconnected, as by another user terminating the call or poor network conditions. When the call management system detects a disconnected call, the call management system records the spoken speech into a buffer and determines which portion of the user's speech was not processed and communicated—termed "un-communicated speech"—to the other user. The user whose call was terminated is provided with an option to provide the un-communicated speech to the other user. Options can include sending a text version of the un-communicated speech to the other user or sending a voice file to the other user.

In at least some other embodiments, the call management system detects that a user is on an active call and is on mute. The call management system detects that the user has spoken while the muting option has been activated and records the user's spoken speech to a buffer. The call management system can then enable the un-communicated speech to be communicated to other users on the call. Various options exist for enabling the un-communicated speech to be communicated to the other users, all of which are discussed below in more detail.

In at least some other embodiments, the call management system manages calls by enabling a user to re-send information that is requested by another user on the call. For example, the user may convey information or attempt to convey information to the other user. This information may not be conveyed in its entirety due to call or network conditions. The call management system can process the user's speech and monitor for requests from the other user to repeat any such information. When the call management system detects a request to repeat the information, the call management system provides functionality to enable user to resend his or her un-communicated speech to the other user.

The various embodiments improve upon the state of the art by managing calls in a manner in which un-communicated speech during or after a call can be communicated to an intended recipient. This can greatly improve the user experience and can ensure that, in many if not all instances in which speech is un-communicated, the un-communicated speech can be recovered and conveyed to the intended recipient. Thus, the various embodiments promote the integrity of both voice and video calls by ensuring that the complete content of a call reaches all of the intended recipients.

In the discussion that follows, an operating environment is described in which the inventive embodiments can be employed. Following this, various embodiments for managing calls are described.

Operating Environment

Figure 1:
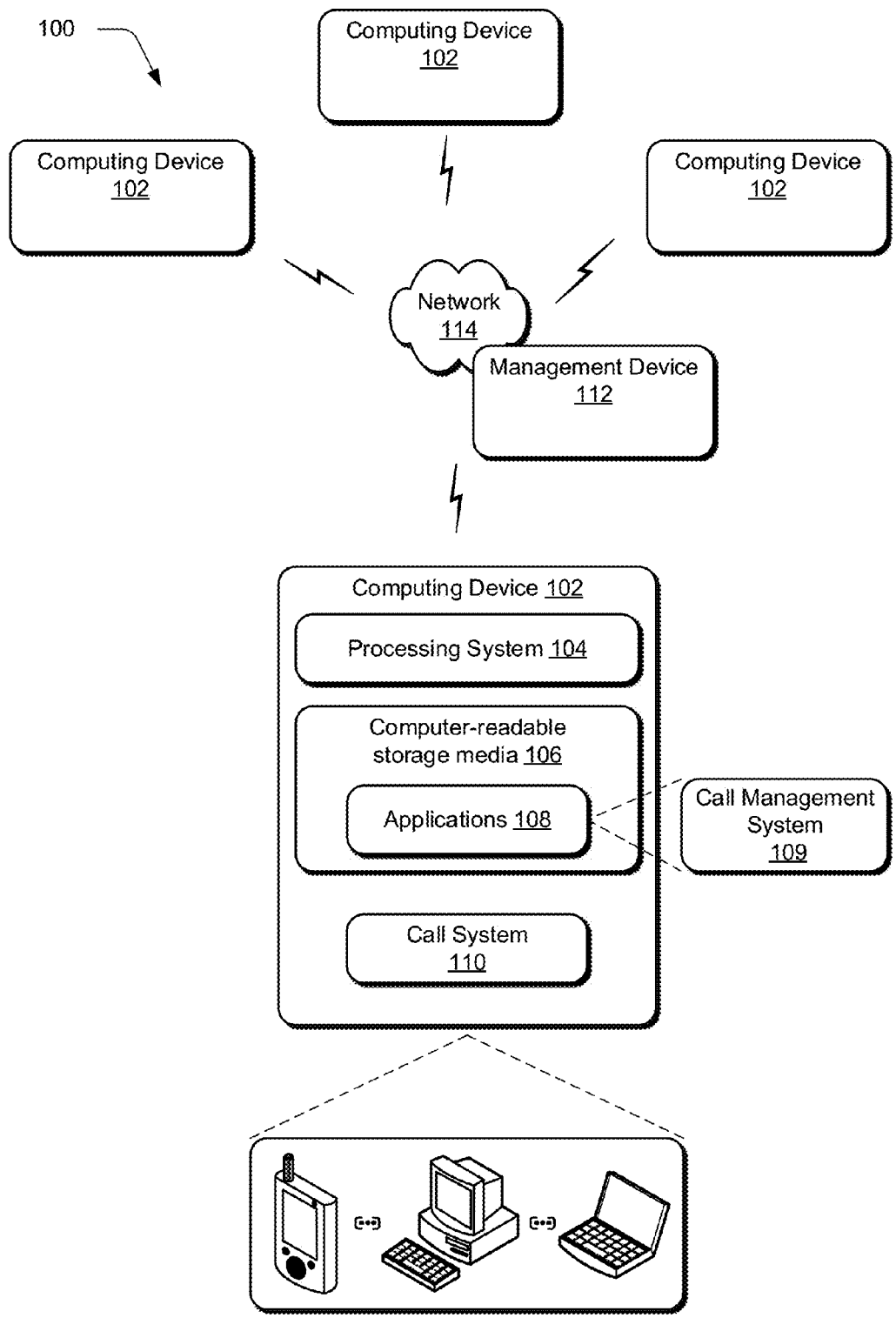
FIG. 1 illustrates an operating environment in accordance with one or more embodiments.

FIG. 1 is an illustration of an environment 100 in an example implementation that is operable to employ techniques described herein. The illustrated environment 100 includes multiple computing devices 102. Each computing device 102 includes, as shown in the bottom-most computing device 102, a processing system 104 that includes one or more processing devices, one or more computer-readable storage media 106, and various applications 108 embodied on the computer-readable storage media 106 and operable via the processing system 104 to implement corresponding functionality described herein. Applications 108 can include a call management system 109 that is operable to manage calls as described in more detail below. The call management system 109 can be a standalone application. Alternately, the call management system 109 can be included as part of another application, plug-in, or system software such as a computing device's operating system. Computing devices 102 also include a call system 110 that enables a caller to place calls, such as voice and video calls as described above and below. The calls can include Voice over IP ("VoIP") calls, as well as other calls placed using other different technology.

The computing devices 102 may be configured as any suitable type of computing device. For example, the computing devices may be configured as a television entertainment system, desktop computer, a laptop computer, a mobile device (e.g., assuming a handheld configuration such as a tablet or mobile phone), a tablet, and so forth. Further, the computing devices may be configured as a radiotelephone, a personal communication system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device (e.g., a wireless telephone), a cellular telephone, or a smart phone.

Thus, the computing devices 102 may range from full resource devices with substantial memory and processor resources (e.g., television entertainment system, personal computers, game consoles) to a low-resource device with limited memory and/or processing resources (e.g., mobile devices).

Environment 100 also includes a management device 112 and network 114 that enables computing devices 102 to communicate with one another by placing calls, such as voice and video calls by accessing network 114 via management device 112.

Management device 112 may include one or more data transfer devices (or network devices), such as a gateway, a router, a switch, a firewall, a network interface card (NIC), a hub, a bridge, a proxy server, an optical add-drop multiplexer (OADM), or some other type of device that processes, manages, and/or transfers traffic. In one example, management device 112 may include one or more edge devices (e.g., edge routers) that provide entry points into enterprise, carrier, and/or service provider networks.

Network 114 may include a local area network (LAN), a wide area network (WAN), a metropolitan area network (MAN), a telephone network, such as the PSTN, a cellular network, a Wi-Fi network, an intranet, the Internet, an optical fiber (or fiber optic)-based network, an enterprise network, a carrier network, a service provider network, or a combination of networks. In one example implementation, network 114 may include an open network. An open network may include a network of applications, devices, and/or systems that follows industry protocols and thereby create an environment of total interoperability. This means that any new protocol-based products (e.g., for the open network) may automatically be compatible with other compliant products, applications, devices, and/or systems, with no additional programming or interfaces needed.

Having considered an example operating environment, consider now embodiments in which calls can be managed in accordance with one or more embodiments. The various embodiments described below provide different ways for managing calls—both voice calls and video calls.

Managing Un-Communicated Speech when a Call Disconnects

In at least some embodiments, call management system 109 detects that a user is on an active call. The call management system detects that the user has continued to speak when the call was disconnected, as by another user terminating the call or poor network conditions. When the call management system detects a disconnected call, the call management system records the spoken speech into a buffer and determines which portion of the user's speech was not processed and communicated—termed "un-communicated speech"—to the other user. The user whose call was terminated is provided with an option to provide the un-communicated speech to the other user. Options can include sending a text version of the un-communicated speech to the other user or sending a voice file to the other user.

Figure 2:
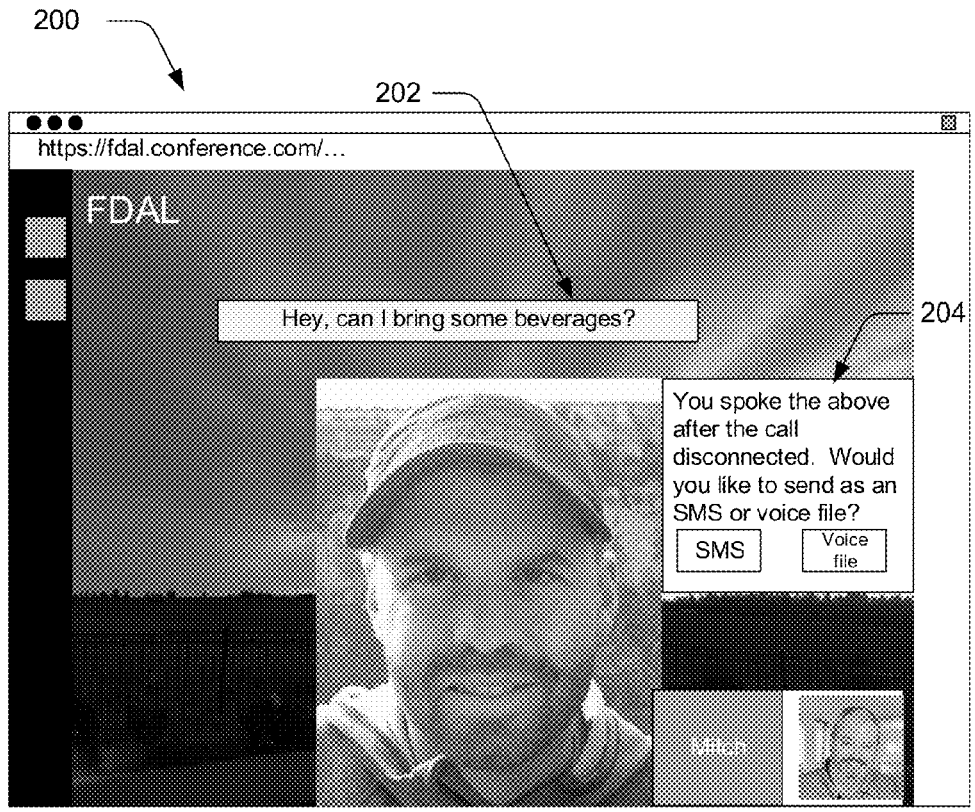
FIG. 2 illustrates an example user interface in accordance with one or more embodiments.

As an example, consider FIG. 2 which illustrates an example user interface, generally at 200, for a call system in which users can conduct a video call such as a VOIP call. In this example, Dan has called Mitch and when Mitch answers the call, Dan says "Hey Mitch! What's up?". Mitch responds and reminds Dan that Dan is invited to Mitch's house for the Packers game. Dan then asks what time he should come over, to which Mitch responds " . . . about 11 or so?" Dan responds, "Sure thing—I'll be there." Mitch then hangs up to disconnect the call. Not knowing that Mitch has disconnected the call, Dan continues "Hey, can I bring some beverages?" In this instance, the call management system, such as call management system 109 (FIG. 1) ascertains that the call has been disconnected and records the spoken, but un-communicated speech "Hey, can I bring some beverages?" The call management system then processes the un-communicated speech, as by speech-to-text translation, and presents the text to the user. In this particular example, a user interface instrumentality 202 presents the text to the user. In addition, an option window 204 is presented and notifies Dan that he has un-communicated speech and provides Dan with different options for conveying the un-communicated speech to Mitch. In this particular example, Dan is provided with an option to send the un-communicated speech as an SMS message or instead to send a voice file with the recorded un-communicated speech. If Dan selects the SMS message option, an SMS text message will be sent to Mitch. If, on the other hand, Dan selects the voice file option, a voice file such as a .Wav file will be sent to Mitch. If Dan selects neither option, after a predetermined period of time, the call management system will make a decision to do nothing.

In this particular example, the user participated in a video call in which options for sending un-communicated speech were visually displayed for the user. In some instances, the user may participate in an audio call in what is referred to as a "no touch/no see" scenario.

Figure 3:
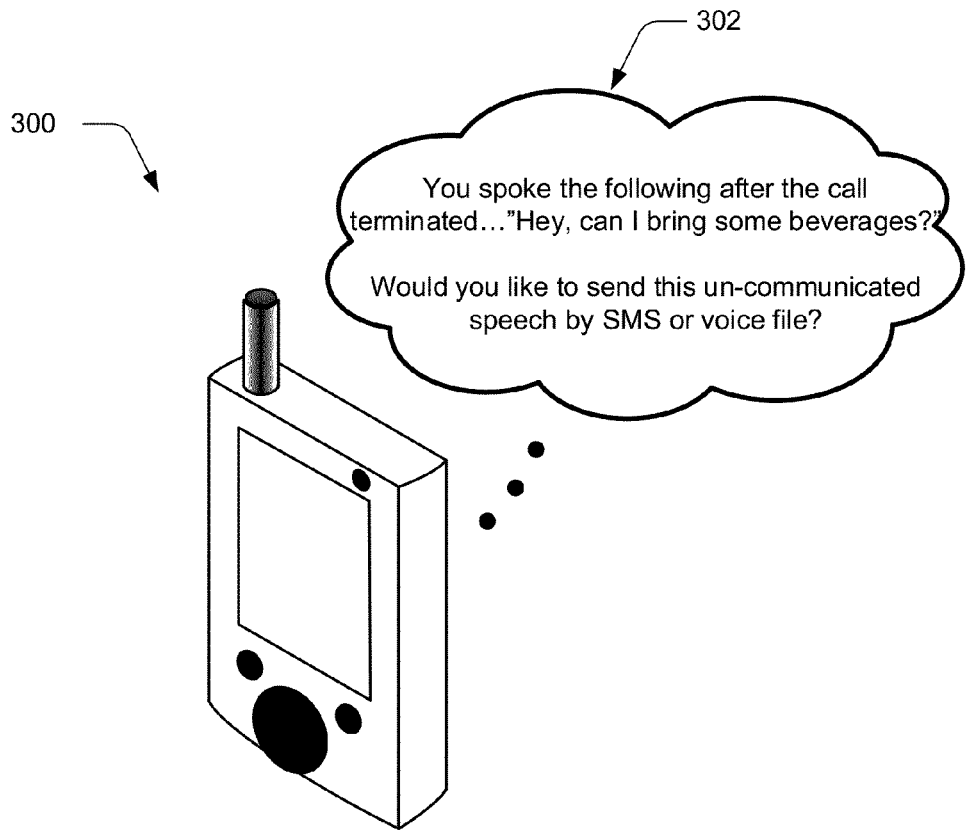
FIG. 3 illustrates an example computing device in accordance with one or more embodiments.

As an example, consider FIG. 3 which illustrates a cell phone generally at 300. Assume that in this instance Dan is driving in his Jeep and uses his phone's hands-free, voice mode to place an audio call to Mitch. Assume that the same conversation takes place and that Mitch disconnects the call as in the above example, while Dan continues to talk. Because Dan is using a hands-free, voice mode, an option window is not presented. Rather, the call management system provides audible options as indicated by the speech bubble 302. In this particular example, Dan is provided with an option to send the un-communicated speech as an SMS message or instead to send a voice file with the recorded un-communicated speech. If Dan selects the SMS message option, as by stating "SMS", an SMS text message will be sent to Mitch. If, on the other hand, Dan selects the voice file option, as by stating "voice file", a voice file such as a .Wav file will be sent to Mitch. If the user selects neither option, after a predetermined period of time, the call management system will make a decision to do nothing.

Example method 400 is described with reference to FIG. 4. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
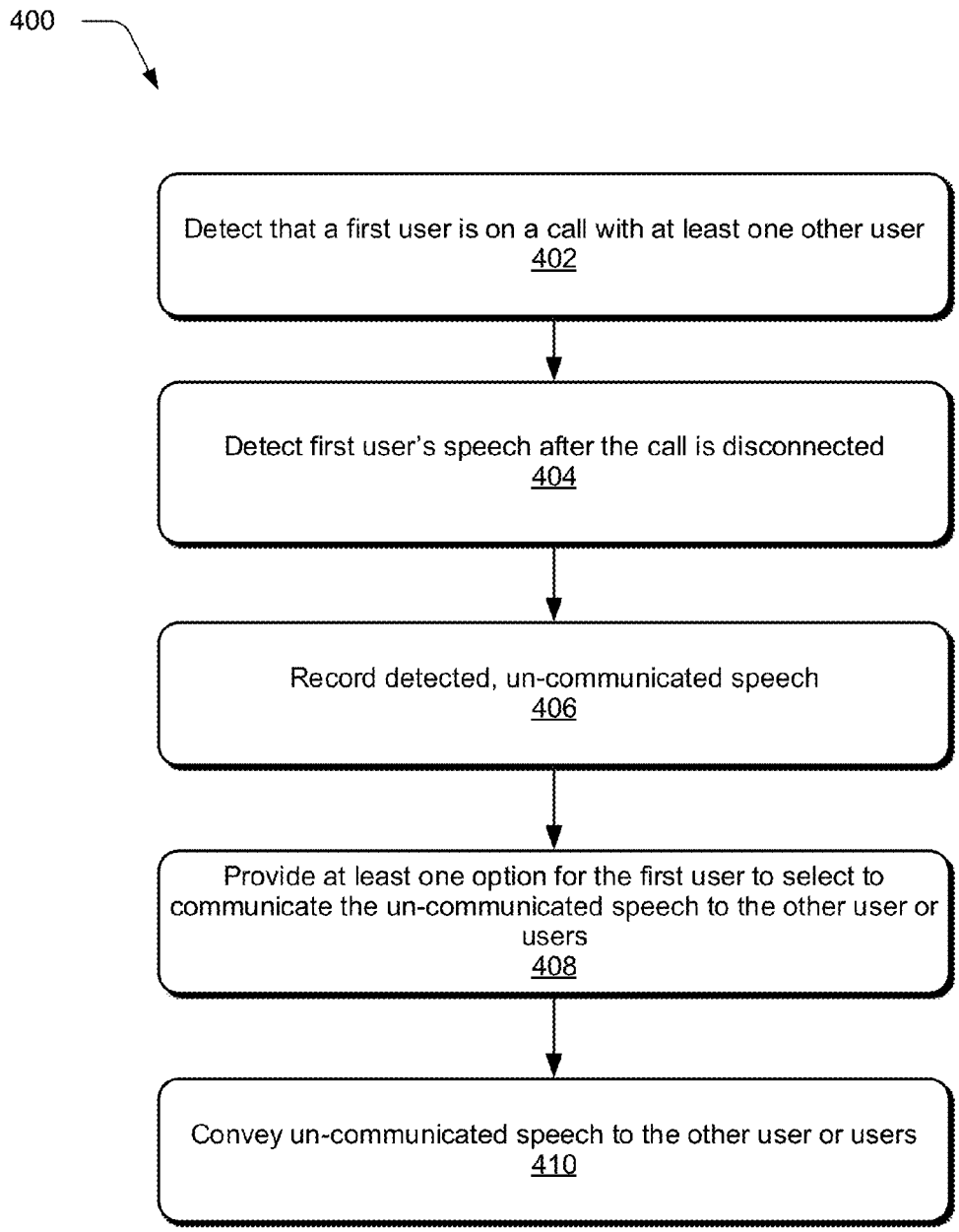
FIG. 4 is a flow diagram that describes operations in accordance with one or more embodiments.

FIG. 4 illustrates example method 400 of managing un-communicated speech when a call disconnects as described herein. The order in which the method is described is not intended to be construed as a limitation, and any number or combination of the described method operations can be performed in any order to perform a method, or an alternate method.

At block 402, the call management system detects that a first user is on a call with at least one other user. At block 404, the call disconnects and the call management system detects the first user's speech after the call is disconnected. At block 406, the call management system records the detected, un-communicated speech. This step can be performed in any suitable way. For example, the entire call may be recorded from the beginning and placed into a buffer. Alternately or additionally, when the call management system detects that the call has disconnected, the call management system can automatically begin recording for any detected speech. At block 408, at least one option is provided for the first user to select to communicate the un-communicated speech to the other user or user's. This step can be performed in any suitable way. For example, in at least some embodiments a visual notification can be provided to enable the user to make a selection of one or more options. An example of how this can be done is provided above in connection with FIG. 2. Alternately or additionally, an audible notification can be provided to enable the user to make a selection of one or more options. An example of how this can be done is provided above in connection with FIG. 3. Responsive to receiving a user's option selection, the un-communicated speech is conveyed to the other user or users at block 410. This step can be performed in any suitable way, examples of which are provided above.

The method just described and the embodiments described above improve upon the state of the art by automatically enabling a user to convey un-communicated speech to other users in the event of a disconnected call. This relieves the users of having to physically establish another call. Furthermore, the state of the art is improved because the user is relieved of having to remember to convey their un-communicated speech to other users. This, in turn, promotes the integrity of the communication taking place between the users.

Having considered embodiments that manage un-communicated speech when a call disconnects, consider now embodiments that manage un-communicated speech when a call mutes.

Managing Un-Communicated Speech when a Call Mutes

In at least some other embodiments, the call management system detects that a user is on an active call and is on mute. For example, the user may have activated a muting option to mute their audio. Alternately, the user may have been muted by another user on the call. Alternately, the user may have joined the call and by default is placed on mute. The call management system detects that the user has spoken while the muting option has been activated and records the user's spoken speech to a buffer. The call management system can then enable the un-communicated speech to be communicated to other users on the call. Various options exist for enabling the un-communicated speech to be communicated to the other users.

Figure 5:
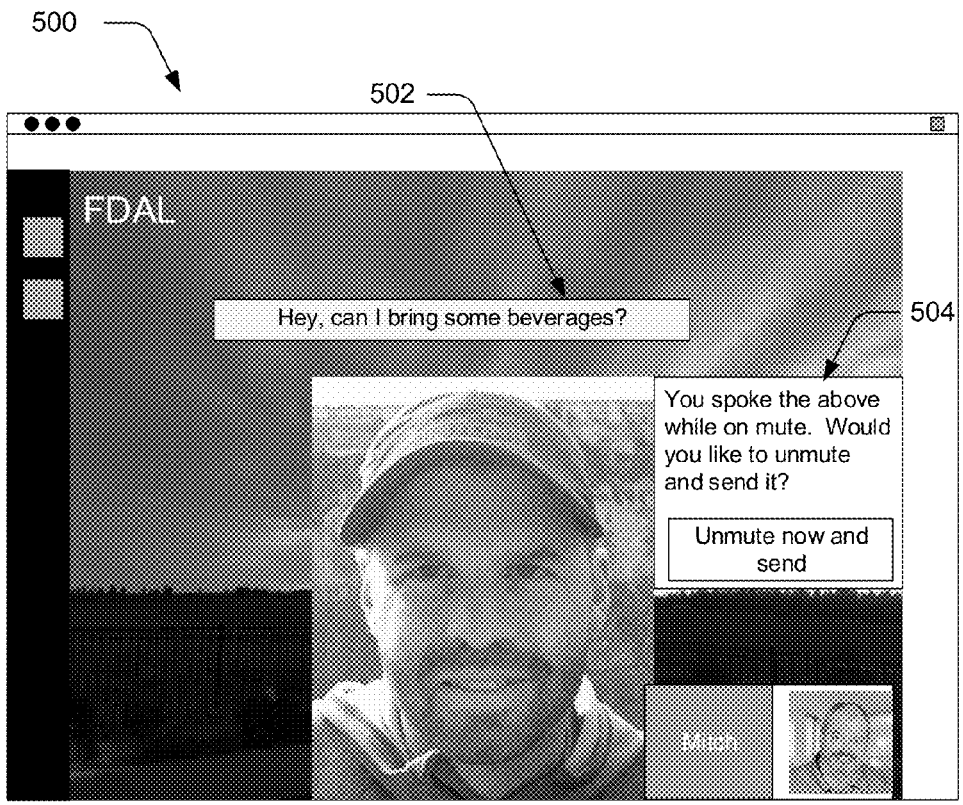
FIG. 5 illustrates an example user interface in accordance with one or more embodiments.

As an example, consider FIG. 5 which illustrates an example user interface, generally at 500, for a call system in which users can conduct a video call such as a VOIP call. In this example, Dan has again called Mitch and when Mitch answers the call, Dan says "Hey Mitch! What's up?". Mitch responds and reminds Dan that Dan is invited to Mitch's house for the Packers game. Dan then asks what time he should come over, to which Mitch responds " . . . about 11 or so?" Dan responds, "Sure thing—I'll be there." Dan then mutes the call because his boys are wrestling and being a little noisy. In operation, when Dan mutes the call, the computing device's microphone still receives the speech input. However, the call system software does not process the speech input to provide it to the other callers. Therefore, the computing device is able to monitor for speech that occurs while the call system is on mute.

Forgetting that he is on mute, Dan continues "Hey, can I bring some beverages?" In this instance, the call management system, such as call management system 109 (FIG. 1) ascertains that the call has been muted and that Dan has spoken. The call management system records the spoken, but un-communicated speech "Hey, can I bring some beverages?" The call management system then processes the un-communicated speech, as by speech-to-text translation, and presents the text to the user. In this particular example, a user interface instrumentality 502 presents the text to the user. In addition, an option window 504 is presented and notifies Dan that he has un-communicated speech and provides Dan with an option to communicate the un-communicated speech. In this example, the option window states "You spoke the above while on mute. Would you like to unmute and send it?" If Dan selects this option, the call system's microphone will be programmatically unmuted and the recorded, un-communicated speech will be communicated to Mitch as by being played back for Mitch.

If Dan does not select this option, after a predetermined period of time, the call management system will make a decision to do nothing.

Example method 600 is described with reference to FIG. 6. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
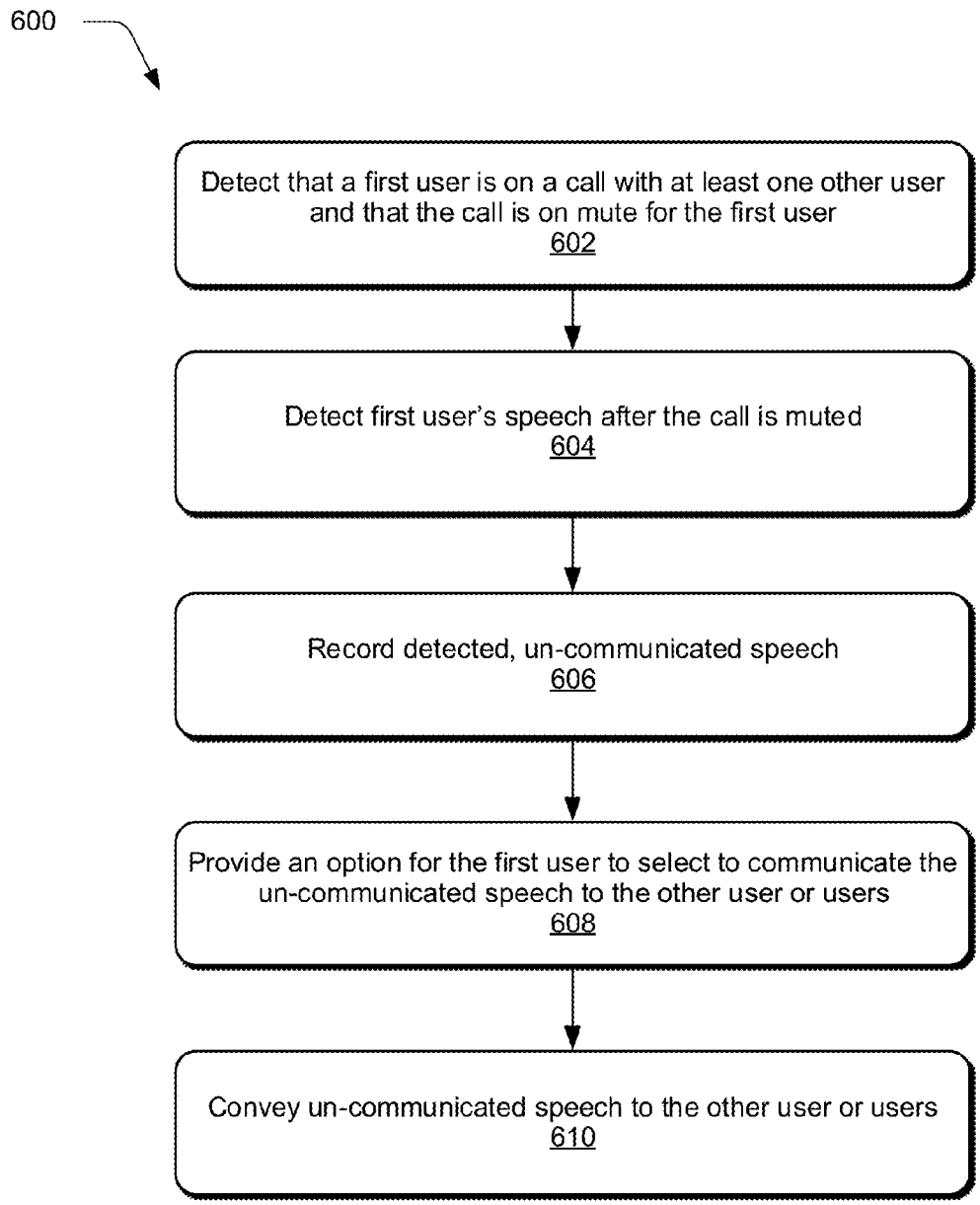
FIG. 6 is a flow diagram that describes operations in accordance with one or more embodiments.

FIG. 6 illustrates example method 600 of managing un-communicated speech when a call is muted as described herein. The order in which the method is described is not intended to be construed as a limitation, and any number or combination of the described method operations can be performed in any order to perform a method, or an alternate method.

At block 602, the call management system detects that a first user is on a call with at least one other user and that the call has been muted for the first user. The call can be muted in any suitable way. For example, the call can be muted by the first user by activating a muting option. Alternately, the user may have been muted by another user on the call. Alternately, the user may have joined the call and by default is placed on mute. At block 604, the call management system detects the first user's speech after the call is muted. At block 606, the call management system records the detected, un-communicated speech. This step can be performed in any suitable way. For example, as soon as the call is muted, the call management system can start recording in the event any speech occurs. Alternately, after the call is muted, if the call management system detects the first user's speech, the call management system can automatically begin recording the speech. At block 608, an option is provided for the first user to select to communicate the un-communicated speech to the other user or user's. This step can be performed in any suitable way. For example, in at least some embodiments a visual notification can be provided to enable the user to make a selection of one or more options. An example of how this can be done is provided above in connection with FIG. 5. Responsive to receiving a user's option selection, the un-communicated speech is conveyed to the other user or users at block 610. This step can be performed in any suitable way, examples of which are provided above.

The method just described and the embodiments described above improve upon the state of the art by automatically enabling a user to convey un-communicated speech to other users in the event of a call mute during a time when the user is speaking. This relieves the users of having to repeat the un-communicated speech. This promotes the integrity of the communication taking place between the users by ensure that all communication during a call reaches all users.

Having considered how un-communicated speech can be managed when a call is muted, consider now an extension of this concept that takes into account different locales and different dialects that might be used by the users.

Typically, calls between multiple users will take place using a common language. For example, while some of the users may speak more than one language, all of the users on a call may speak in English during the call. One of the users on the call may be located in India and may speak Hindi as well. In this instance, the call management system knows the locales of all the users on a call. The call management system can ascertain the locales of the users in any suitable way including, by way of example and not limitation, from user profiles that may be on hand, from information derived from the call itself, and the like. By virtue of knowing the locales, the call management system also knows the dialects that are spoken in the various locales. Thus, if a user is in India, the call management system would know of all the various dialects that are spoken in India. Similarly, if the user is in China, the call management system would know all of the dialects that are spoken in China.

In various embodiments, when a call is on mute for a user, the call management system monitors for any spoken speech that occurs while the call is muted. For example, the user may have muted the call. Alternately, the user may have been muted by another user on the call. Alternately, the user may have joined the call and by default is placed on mute. If speech occurs in a dialect that is different from the common language being used to conduct the call, the call management system can simply ignore the speech that occurs in the different dialect. The assumption in situations where the user has muted the call is that the user has muted the call to communicate in a context that is outside of the call itself. In other muting situations, the assumption is that the user wishes to communicate in a context that is outside of the call. This might be the case, for example, if a user on a call being conducted in English speaks Hindi to his kids to convey some type of message. If, on the other hand, the call is muted and speech occurs in the common language being used to conduct the call, the process described in FIG. 6 can be utilized.

Example method 700 is described with reference to FIG. 7. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
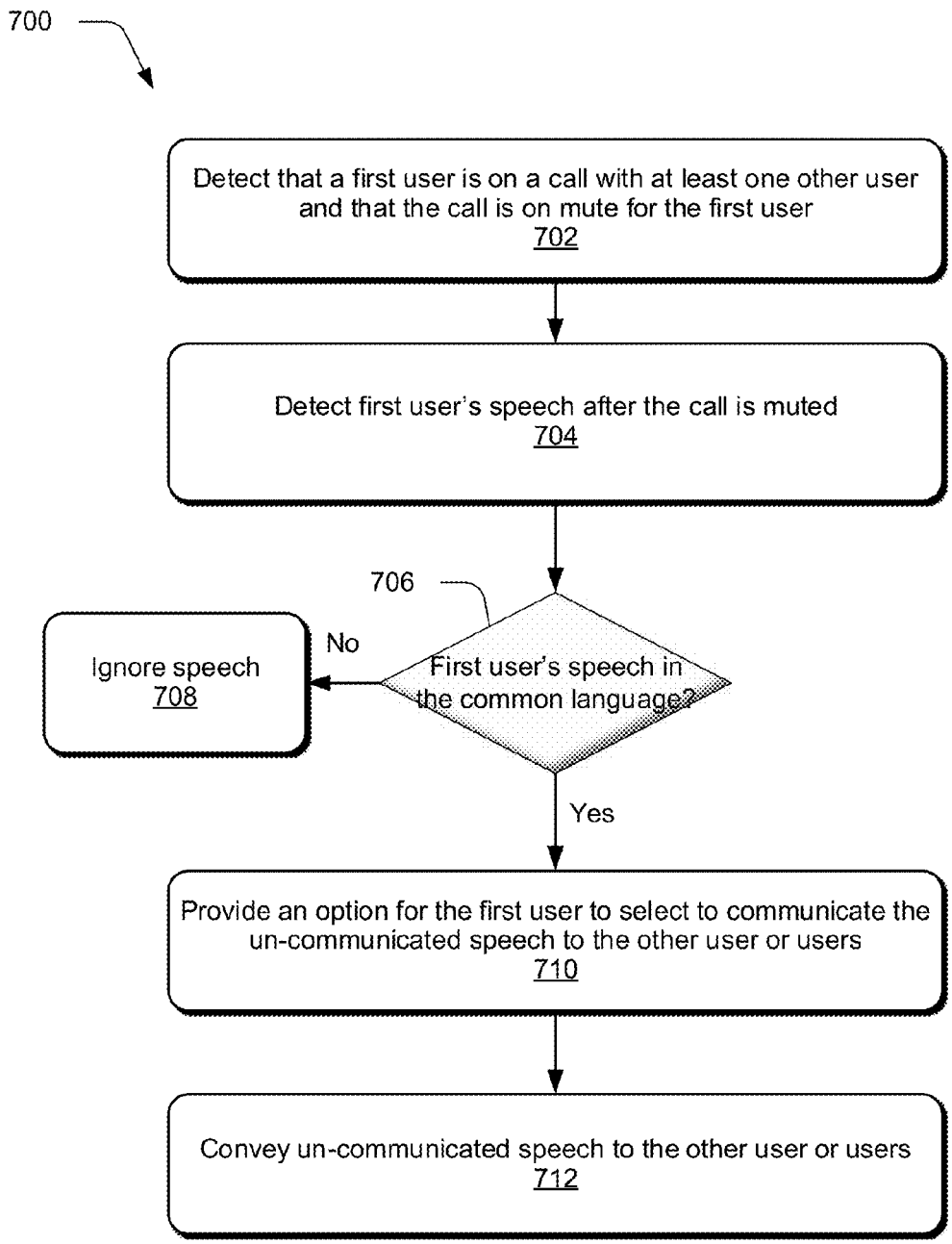
FIG. 7 is a flow diagram that describes operations in accordance with one or more embodiments.

FIG. 7 illustrates example method 700 of managing un-communicated speech when a call is muted as described herein. The order in which the method is described is not intended to be construed as a limitation, and any number or combination of the described method operations can be performed in any order to perform a method, or an alternate method.

At block 702, the call management system detects that a first user is on a call with at least one other user and that the call has been muted for the first user. The call can be muted in any suitable way. For example, the user may have muted the call. Alternately, the user may have been muted by another user on the call. Alternately, the user may have joined the call and by default is placed on mute. In this instance, the call is conducted in a common language. In some embodiments, the call management system detects the language in which the call is being made. In other embodiments, the user can select, by way of a suitably-configured user interface, a language with which to conduct the call.

At block 704, the call management system detects the first user's speech after the call is muted. At block 706, the call management system ascertains whether the first user's speech is in the common language being used to conduct the call. This operation can be performed in any suitable way. For example, in at least some embodiments, the call management system can process the first user's speech by recording the speech and converting the speech to text associated with the speech. The text can then be processed or filtered based on the locale in which it was spoken. If the first user's speech is not in the common language, the call management system ignores the speech at block 708. For example, if the conference call is being held in English, if an Indian user on mute speaks Hindi, the speech can be ignored and the text can be discarded. If, on the other hand, the first user's speech is in the common language, an option is provided, at block 710, for the first user to select to communicate the un-communicated speech to the other user or user's. This step can be performed in any suitable way. For example, in at least some embodiments a visual notification can be provided to enable the user to make a selection of one or more options. An example of how this can be done is provided above in connection with FIG. 5. Responsive to receiving a user's option selection, the un-communicated speech is conveyed to the other user or users at block 712. In cases where the above-described feature is supported by the native video call itself, i.e., the call management system, then the call management system itself can send the buffered speech without playback. In situations where the feature is supported as a third-party plug-in, the recorded speech can be played back after programmatically un-muting the microphone.

The method just described and the embodiments described above improve upon the state of the art by automatically enabling a user to convey un-communicated speech to other users in the event of a call mute during a time when the user is speaking. This relieves the users of having to repeat the un-communicated speech. This promotes the integrity of the communication taking place between the users by ensure that all communication during a call reaches all users. Moreover, speech that is determined to not be in the common language of the call can be conveniently ignored because it quite likely does not pertain to the context of the call.

Having considered various embodiments that can process un-communicated speech while a call is on mute, consider now embodiments that manage calls to resend requested information.

Managing Calls to Re-Send Requested Information

In at least some other embodiments, the call management system manages calls by enabling a user to re-send information that is requested by another user on the call. For example, the user may convey information or attempt to convey information to the other user. This information may not be conveyed in its entirety due to call or network conditions. The call management system can process the user's speech and monitor for requests from the other user to repeat any such information. When the call management system detects a request to repeat the information, the call management system provides functionality to enable user to resend his or her un-communicated speech to the other user.

Figure 8:
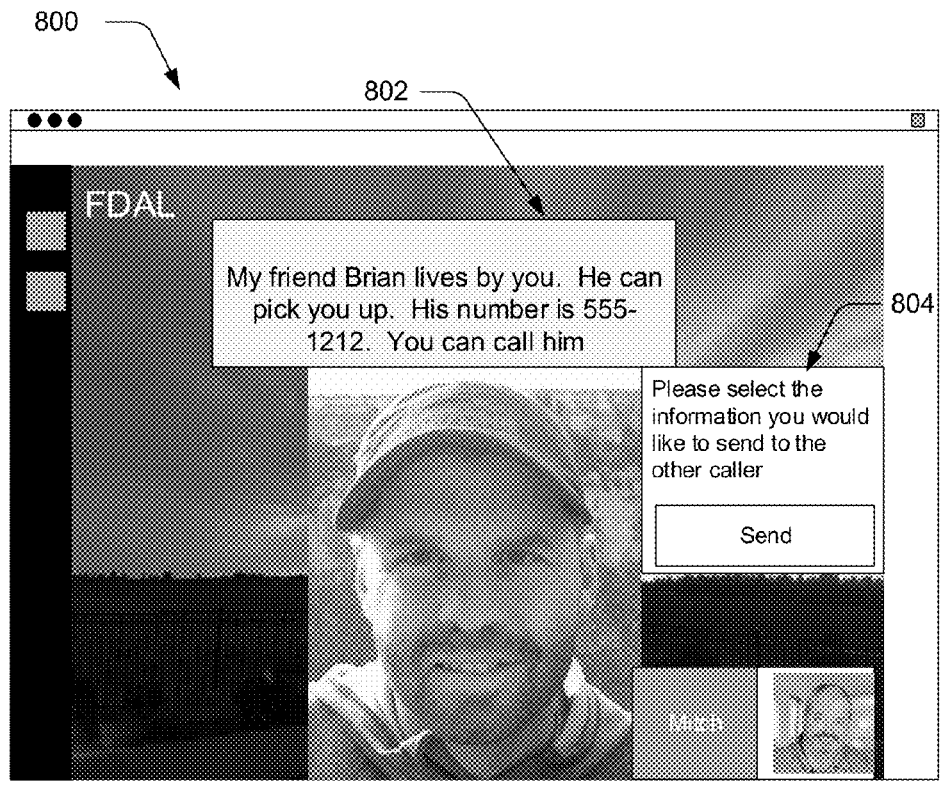
FIG. 8 illustrates an example user interface in accordance with one or more embodiments.

As an example, consider FIG. 8 which illustrates an example user interface generally at 800 for a call system in which users can conduct a video call such as a VOIP call. In this example, Dan has again called Mitch and when Mitch answers the call, Mitch says "Hey Dan! What's up?". Dan responds and reminds Mitch that Mitch is invited to Dan's house for the Packers game and that Dan's friend Brian can pick Mitch up. Dan then attempts to give Mitch Brian's number. However, because of network problems, Mitch does not hear the entire number. Mitch then asks Dan to repeat the number.

In one or more embodiments, user interface 800 includes a user interface instrumentality 802 that is used to present text corresponding to speech that is spoken by the caller. That is, as Dan speaks, the call management system processes Dan's speech and converts the speech to text. The text is then presented in the user interface instrumentality 802. This maintains a mapping of text to speech as the call progresses. In one or more embodiments an option window 804 is presented to enable the user—in this case Dan, to resend his own speech to the other caller. The option window 804 can be presented in any suitable way. For example, in some embodiments, the option window 804 can always be presented. Alternately, the call management system can be configured with dialogue detection functionality that detects words and phrases associated with requests to repeat information. That is, the dialogue detection functionality may listen for words such as "repeat", "can you please repeat that?", "Can you say that again?" and the like. When the call management system detects these words or phrases it makes a contextual determination that there is a need for a specific portion of information to be repeated. In this case, when the call management system makes this contextual determination, it can then cause option window 804 to be presented so that the information can be repeated.

The information can be repeated in any suitable way. For example, the user may select, by way of an input mechanism or touch, the text that is to be repeated. The recorded portion corresponding to the selected text can be automatically played back for the other caller. Alternately or additionally, the selected text may be sent as a message, for example, an SMS message, to the other caller.

Example method 900 is described with reference to FIG. 9. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 9:
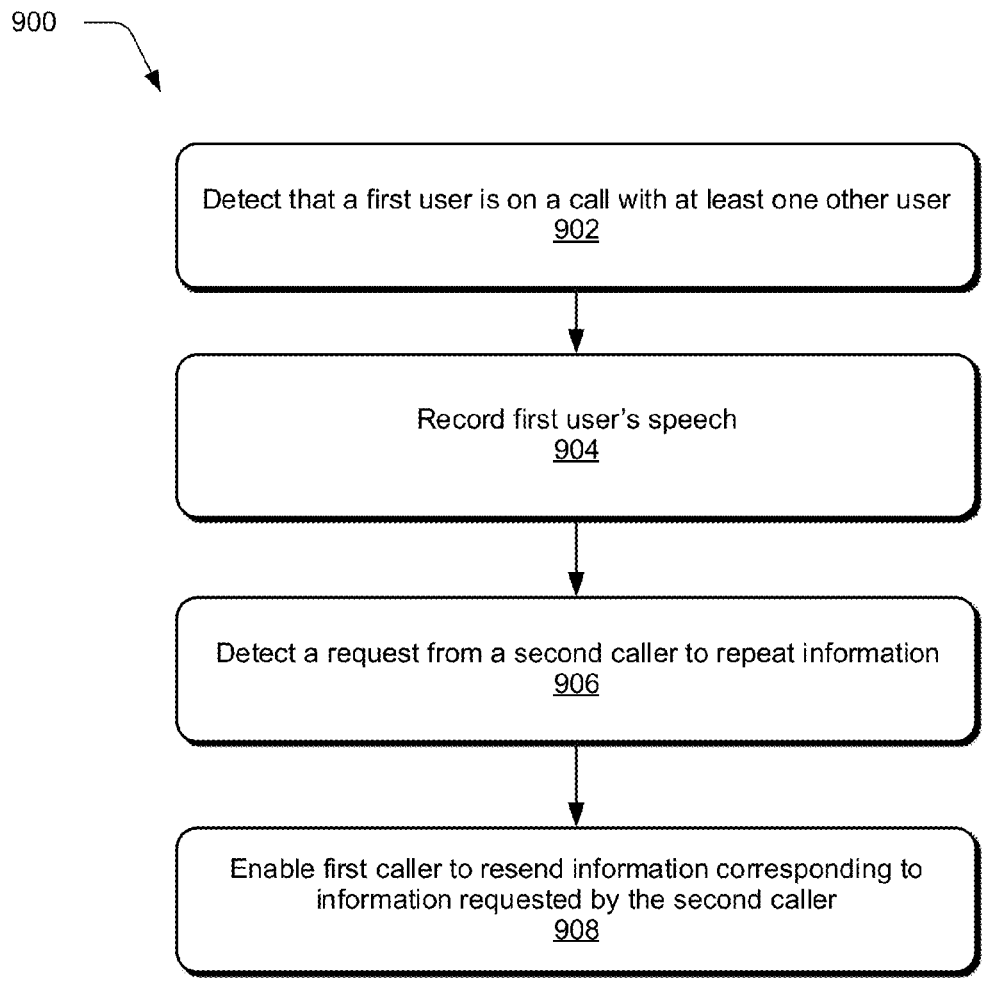
FIG. 9 is a flow diagram that describes operations in accordance with one or more embodiments.

FIG. 9 illustrates example method 900 of managing un-communicated speech when a caller requests for information to be repeated. The order in which the method is described is not intended to be construed as a limitation, and any number or combination of the described method operations can be performed in any order to perform a method, or an alternate method.

At block 902, the call management system detects that a first user is on a call with at least one other user. At block 904, the call management system records the first user's speech. At block 906, the call management system detects a request from a second caller to repeat information. This operation can be performed in any suitable way. For example, the call management system can use dialogue detection functionality to ascertain a word, phrase or phrases associated with a request to repeat information. At block 908, the call management system enables the first caller to resend information corresponding to information requested by the second caller. This operation can be performed in any suitable way. For example, when the first user's speech is recorded at block 904, the speech can be processed to convert the speech to text. This text can then be presented to the first caller so that the first caller can make a selection of which text to send to the second caller. The text can be presented in a user interface instrumentality, such as the one described above. The user interface instrumentality can be presented at any suitable time. For example, the user interface instrumentality can be present during the entirety of the call. Alternately or additionally, the user interface instrumentality can be presented when a request is detected at block 906. In other embodiments, the first caller can resend the information by selecting the text and then selecting an option to replay the selected text.

The method just described and the embodiments described above improve upon the state of the art by automatically enabling a user to quickly and conveniently convey information that is requested to be repeated. This relieves the users of having to repeat the information. Rather, the user can quickly, to a user interface instrumentality, and have the information quickly conveyed to other users on a call. This promotes the integrity of the communication taking place between the users by ensure that all communication during a call reaches all users.

Having considered various embodiments described above, consider now an example device that can be utilized to implement the described embodiments.

Example Device

Figure 10:
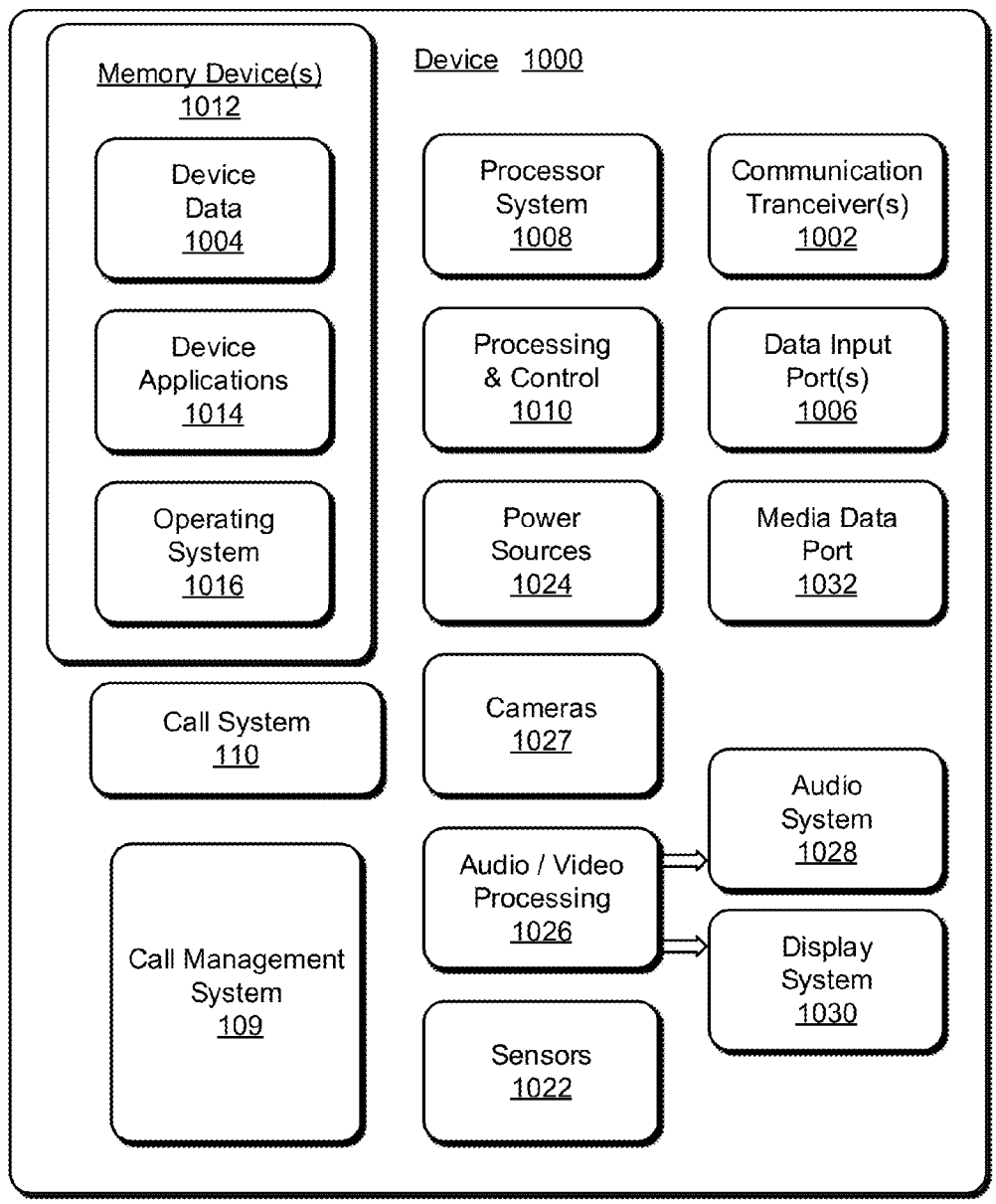
FIG. 10 illustrates various components of an example device that can implement one or more embodiments.

FIG. 10 illustrates various components of an example device 1000 in which embodiments of managing calls can be implemented. The example device 1000 can be implemented as any of the devices described with reference to the previous figures, such as any type of client device, mobile phone, tablet, computing, communication, entertainment, gaming, media playback, and/or other type of electronic device.

The device 1000 includes communication transceivers 1002 that enable wired and/or wireless communication of device data 1004 with other devices. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 1000 may also include one or more data input ports 1006 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1000 includes a processing system 1008 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternately or in addition, the device can be implemented with any one or combination of software, hardware, firmware, or fixed logic circuitry that is implemented in connection with processing and control circuits, which are generally identified at 1010. The device 1000 may further include any type of a system bus or other data and command transfer system that couples the various components within the device. A system bus can include any one or combination of different bus structures and architectures, as well as control and data lines.

The device 1000 also includes computer-readable storage memory 1012 that enable data storage, such as data storage devices that can be accessed by a computing device, and that provide persistent storage of data and executable instructions (e.g., software applications, programs, functions, and the like). Examples of the computer-readable storage memory 1012 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1000 may also include a mass storage media device.

The computer-readable storage memory 1012 provides data storage mechanisms to store the device data 1004, other types of information and/or data, and various device applications 1014 (e.g., software applications). For example, an operating system 1016 can be maintained as software instructions with a memory device and executed by the processing system 1008. The device applications may also include a device manager, such as any form of a control application, software application, signal-processing and control module, code that is native to a particular device, a hardware abstraction layer for a particular device, and so on.

In addition, device 1000 can include call system 110 and call management system 109 that operates as described above and below. The call system 110 and call management system 109 can be implemented in any suitable hardware, software, firmware or combination thereof.

The device 1000 can also include one or more device sensors 1022, such as any one or more of an ambient light sensor, a proximity sensor, a touch sensor, an infrared (IR) sensor, accelerometer, gyroscope, and the like. The device 1000 can also include one or more power sources 1024, such as when the device is implemented as a mobile device. The power sources may include a charging and/or power system, and can be implemented as a flexible strip battery, a rechargeable battery, a charged super-capacitor, and/or any other type of active or passive power source.

The device 1000 also includes an audio and/or video processing system 1026 that generates audio data for an audio system 1028 and/or generates display data for a display system 1030, and multiple cameras 1027. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1032. In implementations, the audio system and/or the display system are integrated components of the example device. Alternatively, the audio system and/or the display system are external, peripheral components to the example device.

Although the embodiments described above have been described in language specific to features and/or methods, the subject of the appended claims is not necessarily limited to the specific features or methods described. Rather, the specific features and methods are disclosed as example implementations, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method, comprising:
    detecting, by a call management system, that a calling device associated with a first user is on a call with a calling device associated with at least one other user;
    detecting, by the call management system, speech from the first user after the call is disconnected by the calling device associated with the at least one other user terminating the call;
    recording, by the call management system, un-communicated speech detected from the first user after the call is disconnected;
    providing, by the call management system, at least one option for the first user to select to communicate the un-communicated speech to said at least one other user; and
    responsive to receiving an option selection from the first user, conveying, by the call management system, the un-communicated speech to said at least one other user.

2. The method as recited in claim 1, wherein said recording is performed responsive to detecting that the call is disconnected.

3. The method as recited in claim 1, wherein said providing at least one option comprises providing a visual notification.

4. The method as recited in claim 1, wherein said providing at least one option comprises providing an audible notification.

5. The method as recited in claim 1, wherein one option comprises an SMS text option.

6. The method as recited in claim 1, wherein one option comprises a voice file option.

7. The method as recited in claim 1, wherein said at least one option comprises an SMS text option and a voice file option.

8. The method as recited in claim 1, wherein said conveying comprises causing an SMS text to be sent to said calling device associated with said at least one other user, said SMS text including the un-communicated speech.

9. One or more non-transitory computer readable media storing computer-readable instructions which, when executed, perform operations comprising:
    detecting that a calling device associated with a first user is on a call with a calling device associated with at least one other user;
    detecting speech from the first user after the call is disconnected by the calling device associated with the at least one other user terminating the call;
    recording un-communicated speech detected from the first user after the call is disconnected;
    providing at least one option for the first user to select to communicate the un-communicated speech to said at least one other user; and
    responsive to receiving an option selection from the first user, conveying the un-communicated speech to said at least one other user.

10. The one or more non-transitory computer readable media as recited in claim 9, wherein said recording is performed responsive to detecting that the call is disconnected.

11. The one or more non-transitory computer readable media as recited in claim 9, wherein said providing at least one option comprises providing a visual notification.

12. The one or more non-transitory computer readable media as recited in claim 9, wherein said providing at least one option comprises providing an audible notification.

13. The one or more non-transitory computer readable media as recited in claim 9, wherein one option comprises an SMS text option.

14. The one or more non-transitory computer readable media as recited in claim 9, wherein one option comprises a voice file option.

15. The one or more non-transitory computer readable media as recited in claim 9, wherein said at least one option comprises an SMS text option and a voice file option.

16. The one or more non-transitory computer readable media as recited in claim 9, wherein said conveying comprises causing an SMS text to be sent to said calling device associated with the at least one other user, said SMS text including the un-communicated speech.

17. A computing device comprising:
    one or more processors; and
    one or more computer readable media storing computer-readable instructions which, when executed, perform operations comprising:
        detecting that a calling device associated with a first user is on a call with a calling device associated with at least one other user;
        detecting speech from the first user after the call is disconnected by the calling device associated with the at least one other user terminating the call;
        recording un-communicated speech detected from the first user after the call is disconnected;
        providing at least one option for the first user to select to communicate the un-communicated speech to said at least one other user; and
        responsive to receiving an option selection from the first user, conveying the un-communicated speech to said at least one other user.

18. The computing device as recited in claim 17, wherein said recording is performed responsive to detecting that the call is disconnected.

19. The computing device as recited in claim 17, wherein said providing at least one option comprises providing a visual notification.

20. The computing device as recited in claim 17, wherein said providing at least one option comprises providing an audible notification.

* * * * *